Patented Apr. 29, 1924.

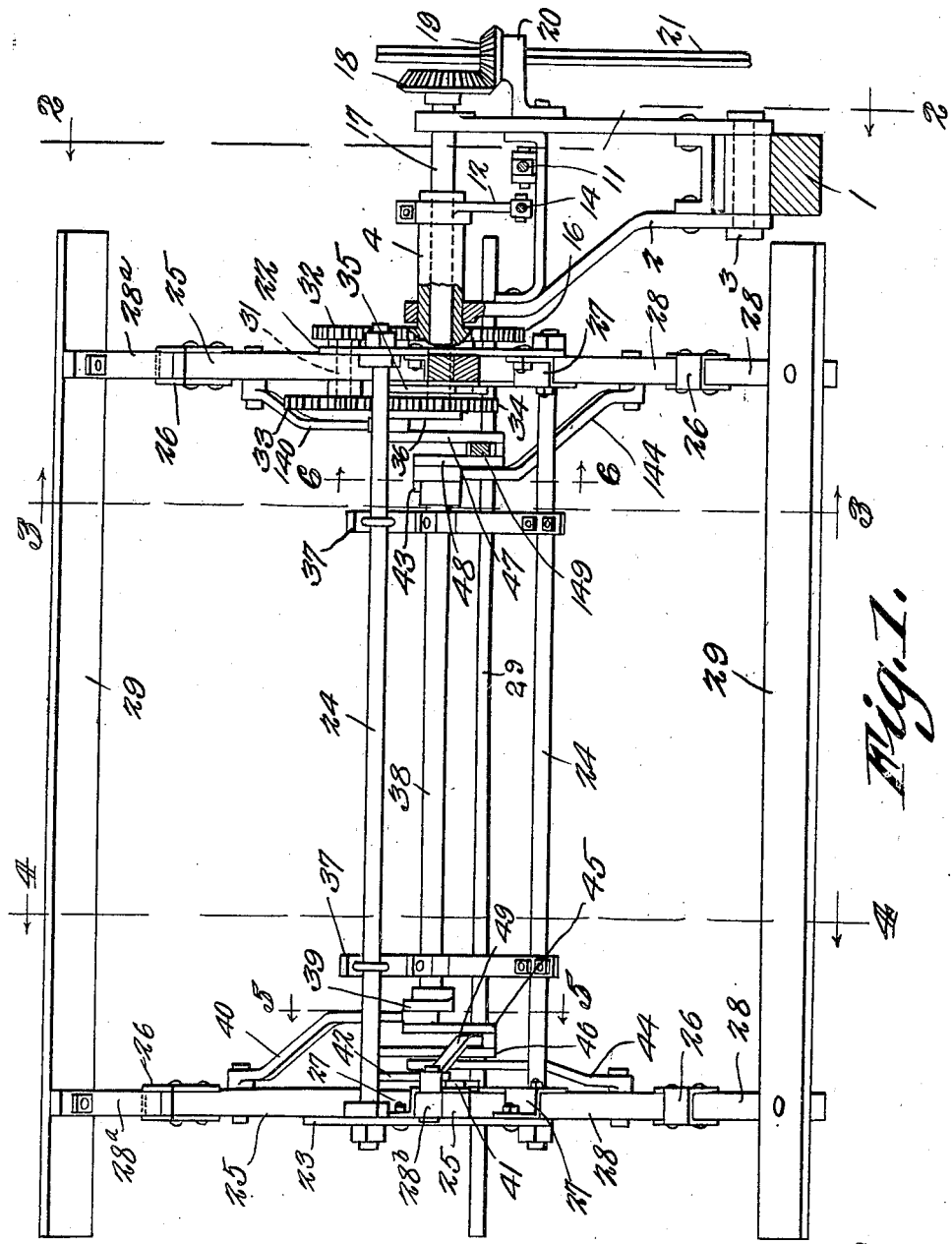

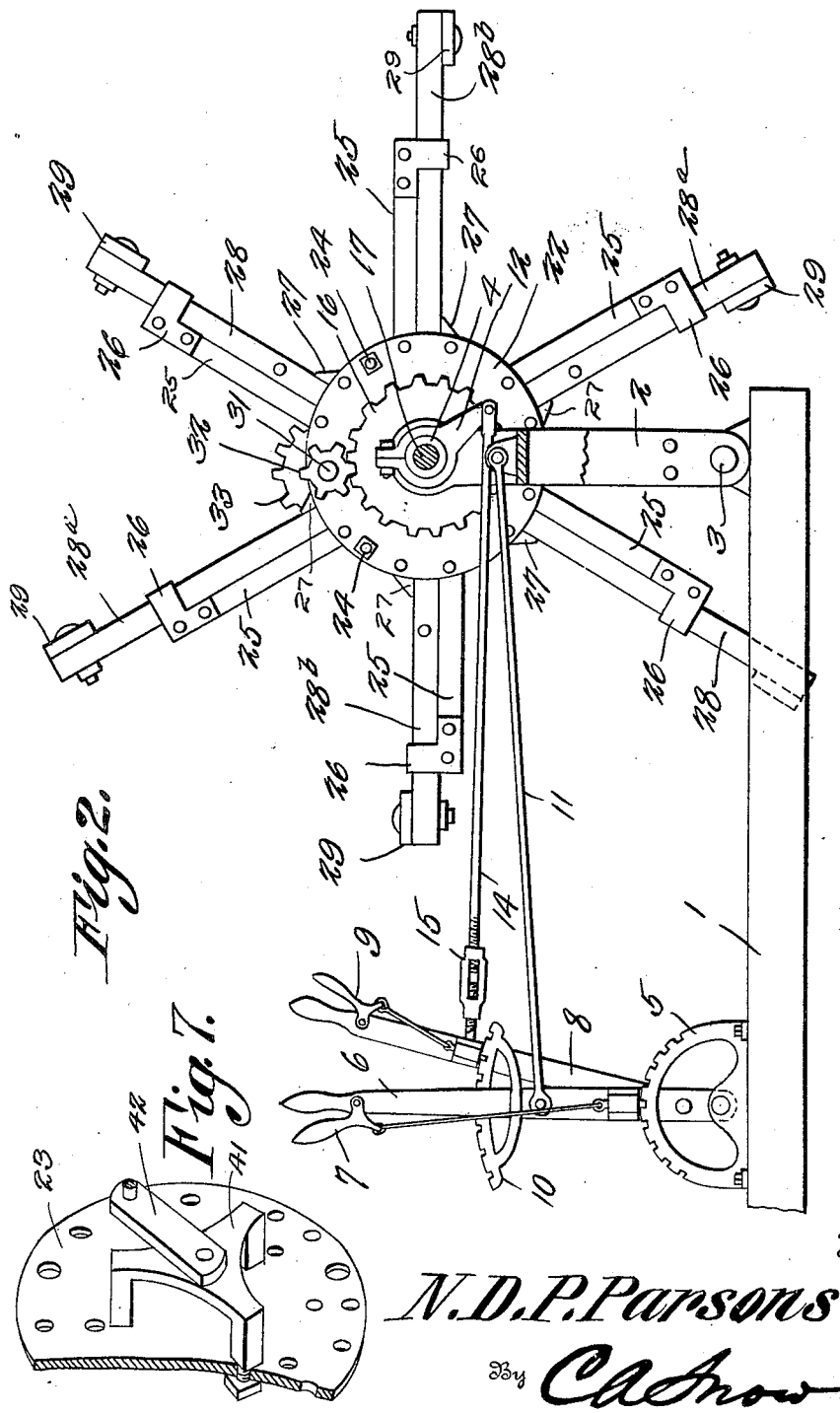

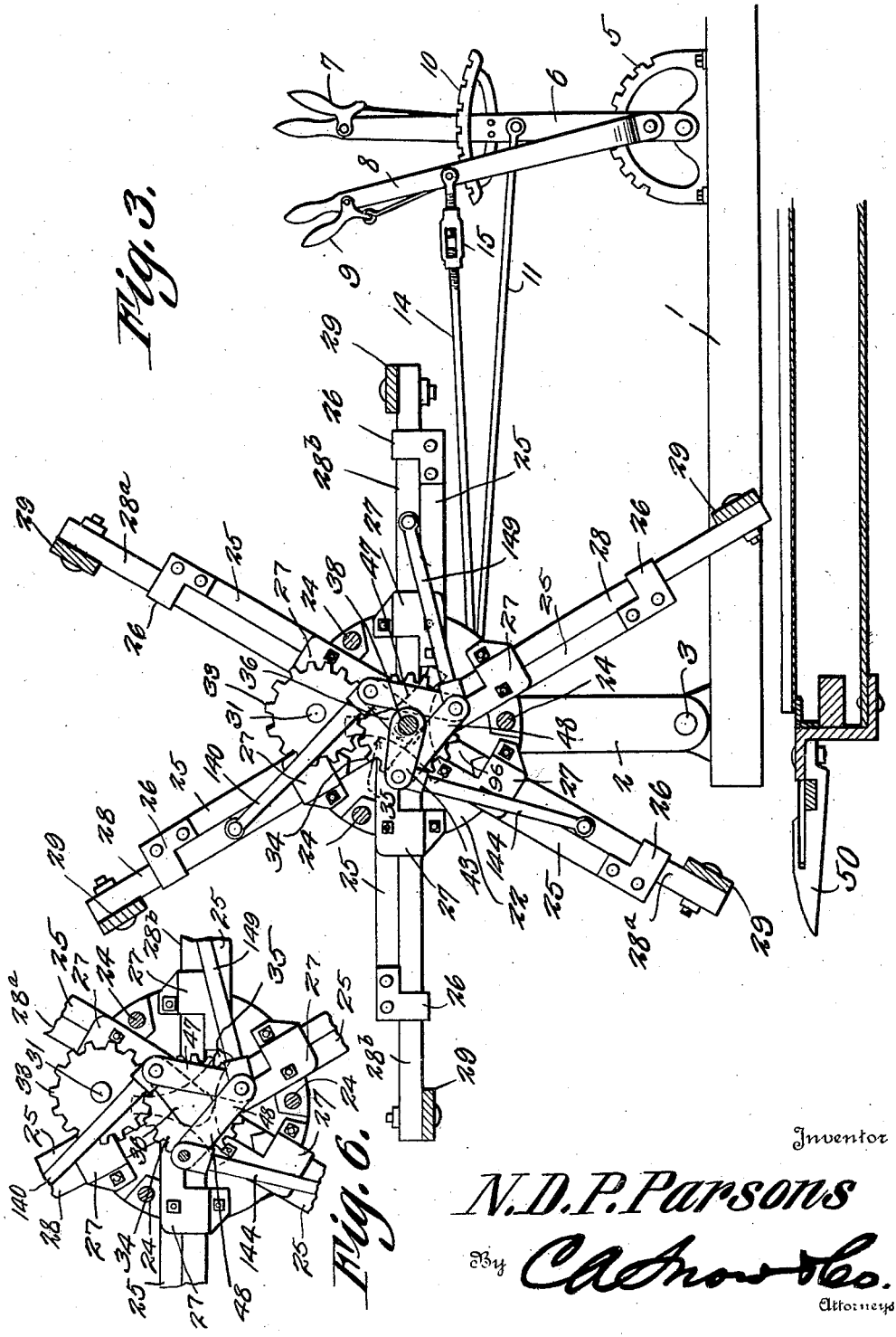

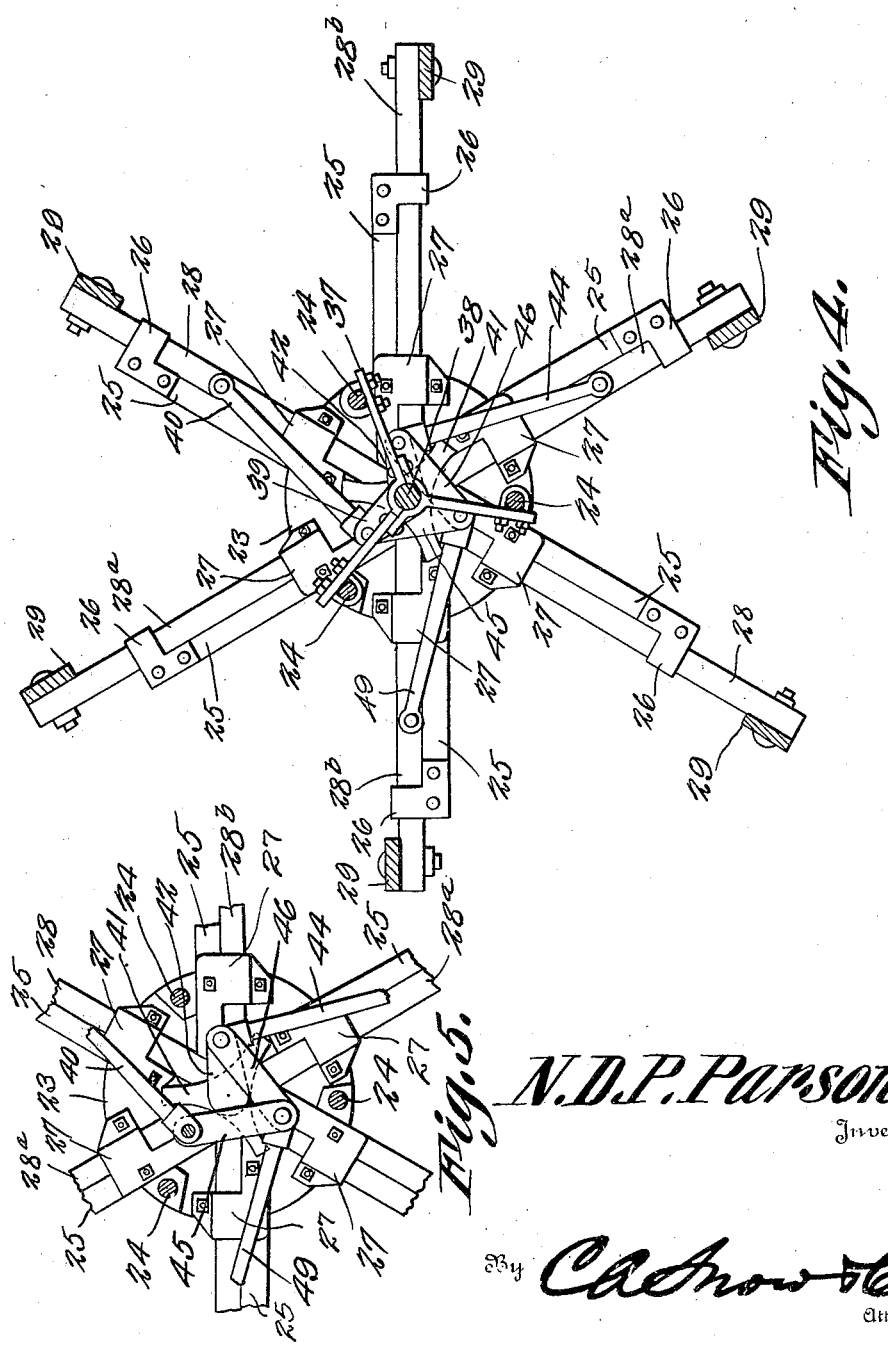

1,492,311

UNITED STATES PATENT OFFICE.

NATHANIEL D. PARRAN PARSONS, OF MOOREFIELD, WEST VIRGINIA.

REEL FOR HARVESTERS.

Application filed April 18, 1922. Serial No. 554,477.

*To all whom it may concern:*

Be it known that I, NATHANIEL D. PARRAN PARSONS, a citizen of the United States, residing at Moorefield, in the county of Hardy and State of West Virginia, have invented a new and useful Reel for Harvesters, of which the following is a specification.

The device forming the subject matter of this application is a reel for harvesters and the invention aims to provide novel means whereby sliding movement may be imparted automatically to the peripheral portions of the reel, so that the said portions will be advanced as they move downwardly and rearwardly, into the grain and toward the cutting mechanism, the object in view being to enable the reel to operate in a satisfactory way upon grain of different heights, and upon grain which is inclined more or less with respect to the vertical. The invention aims, further, to provide novel means whereby the point of reversal in the sliding movement of the movable members of the reel may be shifted both forwardly and backwardly, and vertically, or circumferentially of the reel.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in elevation, a device constructed in accordance with the invention, parts appearing in section; Figure 2 is a section on the line 2—2 of Figure 1; Figure 3 is a section on the line 3—3 of Figure 1; Figure 4 is a section on the line 4—4 of Figure 1; Figure 5 is a section on the line 5—5 of Figure 1; Figure 6 is a section on the line 6—6 of Figure 1; Figure 7 is a perspective view showing the frame and attendant parts which are located at one end of the reel.

The numeral 1 marks any accessible part of a harvester, whereunto a radius arm 2 is pivoted at 3 for swinging movement in a vertical plane. A hollow shaft 4 is rotatable for adjustment in the radius arm 2 but is held against rotation, saving when an adjustment is being effected as will be explained hereinafter. An arm 12 is clamped for adjustment on the shaft 4. A segment 5 is mounted on the member 1 and a main lever 6 is fulcrumed on the segment, the main lever having a latch mechanism 7 adapted to cooperate with the segment. An auxiliary lever 8 is fulcrumed on the main lever 6 and has a latch mechanism 9 adapted to cooperate with a segment 10 on the main lever 6. A link 11 is pivoted at its ends to the main lever 6 and to the radius arm 2. A link 14 is pivoted to the auxiliary lever 8 and to the arm 12 on the hollow shaft 4. A turn buckle 15 is interposed in the link 14 to render it longitudinally adjustable.

An operating shaft 17 is journaled in the hollow shaft 4 and in the radius arm 2. Any suitable means may be provided for rotating the shaft 17. If desired, a beveled pinion 18 on the shaft 17 may mesh with a beveled pinion 19 supported by a bracket 20 carried by the radius arm 2, a drive shaft 21 being mounted in the pinion 19 for rotation therewith and for longitudinal movement therein.

A reel is provided, the same including hub plates 22 and 23 connected by cross rods 24. Fixed arms 25 are mounted on the hub plates 22 and 23 and carry outer guides 26. Inner guides 27 are secured to the arms 25 and to the hub plates 22 and 23. Slidable members 28, 28ª and 28ᵇ in the form of rods are mounted for reciprocation in the guides 26 and 27 and extend across the hub plates 22 and 23 of the reel diametrically, the slidable members being cut away, as shown at 96 in Figure 3, so that they may pass each other at the center of the reel. The rods 28 are connected at their outer ends by cross pieces 29 which form the blades of the reel, the rods 28ª and 28ᵇ being similarly connected.

A short shaft 31 is journaled in the hub plate 22. A pinion 32 is fixed to the outer end of the shaft 31 and meshes into a gear wheel 16 on the hollow shaft 4, the pinion having planetary movement about the gear wheel. A gear wheel 33 is fixed to the inner end of the shaft 31 and meshes with a pinion 34 journaled on a frame 35 secured to the hub plate 22. The frame 35 is employed to carry the pinion 34, in order that there may be a space, inwardly of the hub plate 22, in which the radial rods of the reel, such as the rods 28$^a$, may slide: this observation being understood readily when Figure 1 of the drawing is noted. It is for a like purpose that the frame 41 (hereinafter described, and shown in detail in Figure 7) is connected to the hub plate 23. For convenience in claiming the invention, the shaft 31, the pinion 32 and the gear wheel 33 may be described as a rotatable member forming part of a planetary gear train of which the gear wheel 16 constitutes a member. The pinion 34 is disposed co-axially with the operating shaft 17. An arm 36 is rigidly secured to the pinion 34.

Spiders 37 are mounted on the cross rods 24. A shaft 38 is journaled in the spiders 37 and is disposed co-axially with the pinion 34, the gear wheel 16 and the shaft 17.

The shaft 38 is provided at one end with a crank 43 to which is pivoted the inner end of a connection 144, the outer end of the connection 144 being pivoted to the slide rod 28$^a$ which is adjacent to the hub plate 22 of the reel, a crank 48 is rigidly connected to the outer end of the crank 43. A connection 149 is pivoted at its inner end to the crank 48 and is pivoted at its outer end to the slide rod 28$^b$ which is adjacent to the hub plate 22 of the reel. A crank 47 is connected rigidly at one end to the crank 48 and is rigidly connected at its other end to the arm 36 on the pinion 34. The inner end of a connection 140 is pivotally carried by the outer end of the crank 47 and is pivoted at its outer end to the slide rod 28 which is adjacent to the hub plate 22. Passing to that end of the shaft 38 which is adjacent to the hub plate 23 of the reel, it may be stated that the said end of the shaft carries a crank 39 whereunto is pivoted the inner end of a connection 40, the outer end of the connection 40 being pivoted to the slide rod 28 which is adjacent to the hub plate 23. The inner end of a crank 45 is secured to the outer end of the crank 39. A connection 49 is pivoted to the outer end of the crank 45 and is pivoted to the slide rod 28$^b$ which is adjacent to the hub plate 23. A crank 46 is secured to the outer end of the crank 45 and is secured to the outer end of a crank 42 rotatable on a frame 41 (Fig. 7) attached to the hub plate 23. To the outer end of the crank 46 is pivoted a connection 44, the outer end of the connection 44 being pivoted to the slide rod 28$^a$. The cranks 47, 48 and 43 are so set with respect to each other, and the cranks 39, 45 and 46 are so set with respect to each other that, when the reel is rotated, the blades 29 will move outwardly to a point of reversal, and then move inwardly, a radial reciprocation being imparted to the members 28, 28$^a$ and 28$^b$.

In Figure 3, the numeral 50 marks the cutting mechanism wherewith the reel cooperates.

In practical operation, the reel is rotated through the instrumentality of the shaft 21, the beveled pinion 19, the beveled pinion 18 and the shaft 17, the said shaft being connected to the hub plate 22. Recalling that the shaft 4, although rotatable for adjustment, ordinarily is fixed, it will be understood that the gear wheel 16 is fixed likewise. When the reel is rotated, the pinion 32 has a planetary movement about the gear wheel 16, and rotation is imparted to the shaft 31 and to the gear wheel 33. The gear wheel 33, meshing with the gear wheel 34, rotates the gear wheel 34. When the gear wheel 34 is rotated, the crank arm 36 on the gear wheel, the crank 47, the crank 48 and the crank 43 cooperate to impart rotation to the shaft 38, the cranks 47 and 39 together with the corresponding connections 140 and 40 imparting radial reciprocation to the slidable member 28, the cranks 43 and 46 together with the corresponding connections 144 and 44 imparting radial reciprocation to the slidable member 28$^a$, and the cranks 48 and 45 together with the corresponding connections 149 and 49 imparting radial reciprocation to the slidable member 28$^b$.

As the reel rotates, the slidable members 28, 28$^a$ and 28$^b$ are advanced radially, as the blades 29 move in an orbit, downwardly, toward the cutting mechanism 50. The standing grain, therefore, is caught by the blades 29 and is passed rearwardly to the cutting mechanism 50. The device is so constructed that it will operate upon grain of different heights, and upon grain which may be inclined more or less with respect to the vertical. At a point in the travel of the blades 29, the movement of the slidable members 28, 28$^a$ and 28$^b$ is reversed, and the said members are retracted. The point at which the reversal in the movement of the slidable members 28, 28$^a$ and 28$^b$ of the reel takes place obviously bears an important relation to the grain, and it is necessary to shift this point of reversal, depending upon the height of the grain and the inclination of the grain with respect to the vertical. The main lever 6 may be moved forwardly and backwardly, a swinging movement being imparted to the radius arm 2 through the instrumentality of the link 11. The reel, thus is shifted forwardly and backwardly, and the point of reversal in the movement of the slidable members 28, 28$^a$ and 28$^b$ is adjusted in a horizontal direction, with respect to the cutting mechanism 50. The reel, during this adjustment, is not rotated from the lever 8, because the auxiliary lever 8 is locked by the latch mechanism 9 and the segment 10 to the lever 6 to move with the lever 6 and since the reel is not rotated, the members 28, 28ª and 28ᵇ are not moved radially. It is possible, however, to adjust the point of reversal in the sliding movement of the members 28, 28ª and 28ᵇ, radially of the reel. This is done by shifting the position of the lever 8 with respect to the lever 6, the latch mechanism 9 being engaged with the segment 10 to hold the adjustment which has been secured. When the lever 8 is moved, the link 14, cooperating with the arm 12 on the shaft 4, rotates the said shaft. When the shaft 4 is rotated by movement of the lever 8, the gear wheel 16 is rotated, and becomes a driving element, which, operating through a train of parts comprising the pinion 32, the shaft 31, the gear wheel 33, the pinion 34, the arm 36 and the cranks 47, 48 and 43, rotates the shaft 38 and secures a radial adjustment of the members 28, 28ª and 28ᵇ, the point of reversal in the sliding movement of said members being adjusted radially of the reel. A fine but somewhat slow adjustment may be brought about through the instrumentality of the turn buckle 15 the operator always having at his command a means represented by the auxiliary lever 8, whereby a comparatively rapid adjustment may be effected.

What is claimed is:—

1. In a device of the class described, a reel mounted for rotation and comprising members which have substantially radial sliding movement inwardly and outwardly, a shaft supported for rotation on the reel, connections pivoted to the said slidable members, means for operatively uniting the connections with the shaft eccentrically of the shaft, means for rotating the reel, and means for rotating the shaft responsive to the rotation of the reel.

2. In a device of the class described, a reel mounted for rotation and comprising members which have radial sliding movement inwardly and outwardly; means for imparting inward and outward sliding movement to said members, by the rotation of the reel, thereby to effect a reversal in the radial movement of said members; and means for mounting the reel for swinging movement thereby to adjust the point of reversal in the radial movement of said members.

3. In a device of the class described, a reel mounted for rotation and comprising members which have radial sliding movement inwardly and outwardly; means for imparting inward and outward sliding movement to said members by the rotation of the reel, thereby to effect a reversal in the radial movement of said members; and independent mechanism under the control of an operator for actuating said means thereby to impart radial movement to said members and to change the point of reversal in the radial movement of said members.

4. In a device of the class described, a reel mounted for rotation and comprising members which have radial sliding movement inwardly and outwardly; means for imparting inward and outward sliding movement to said members, by the rotation of the reel, thereby to effect a reversal in the radial movement of said members; means for mounting the reel for swinging movement, thereby to adjust the point of reversal in the radial movement of said members horizontally; and means under the control of an operator for shifting said members radially of the reel, thereby to vary the position of the point of reversal in the radial movement of said members.

5. In a device of the class described, a reel mounted for rotation and comprising members which have radial sliding movement inwardly and outwardly; a relatively fixed gear wheel; a pinion journaled on the reel and having planetary engagement with the gear wheel; and means for connecting the pinion operatively with the slidable members of the reel to impart inward and outward sliding movement thereto.

6. In a device of the class described, an operating shaft supported for rotation; a reel connected to the operating shaft and including members mounted for inward and outward sliding movement; a second shaft mounted for rocking adjustment; a gear wheel fixed to the second shaft; a pinion mounted to rotate on the reel and having planetary engagement with the gear wheel; mechanism for connecting the pinion operatively with the slidable members, to impart inward and outward sliding movement thereto, and to effect a reversal in the direction of sliding movement of said members; and means under the control of an operator for rocking the second shaft, thereby to change the timing of the reversal in the direction of the sliding movement of said members.

7. In a device of the class described, a radius arm mounted for swinging movement; an operating shaft journaled in the radius arm; a hollow shaft journaled for adjustment on the operating shaft; a main lever and a fulcrum therefor; an auxiliary lever and a fulcrum therefor; a connection between the main lever and the radius arm, whereby swinging movement may be imparted to the radius arm from the main lever; a connection between the auxiliary lever and the hollow shaft and constituting means for rotating the hollow shaft for adjustment; a gear wheel fixed on the hollow shaft; a reel carried by the operating shaft and including slidable members; a pinion journaled on the reel and having planetary engagement with the gear wheel; and means for connecting the pinion operatively with the slidable members to impart sliding movement thereto.

8. In a device of the class described, a reel supported for rotation; a member slidable on the reel inwardly and outwardly thereof; a relatively fixed gear wheel; a shaft journaled in the reel; a first pinion on the shaft and having planetary movement about the gear wheel; a second gear wheel, carried by the shaft; a second pinion journaled on the reel and meshing with the second gear wheel; a connection pivoted to the slidable member, and means for uniting the connection pivotally to the second pinion, eccentrically thereof.

9. In a device of the class described, a reel supported for rotation, members reversably slidable inwardly and outwardly on the reel, a shaft rotatably supported by the reel, mechanism for connecting the shaft with said members, a planetary gear train comprising a rotatable member carried by the reel and a normally fixed gear member, mechanism for connecting the rotatable member with the shaft, the train, said mechanisms and the shaft, constituting means for moving the slidable members inwardly and outwardly responsive to the rotation of the reel, and means under the control of an operator for moving the normally fixed gear member, thereby to effect a change in the point of reversal of the slidable members.

10. In a device of the class described, a reel supported for rotation, members reversably slidable inwardly and outwardly on the reel, means operated by the rotation of the reel for sliding said members inwardly and outwardly, and mechanism under the control of an operator for actuating said means, thereby to bring about an adjustment in the point of reversal of the sliding movement of said members.

11. A device of the class described, constructed as set forth in claim 10 and further characterized by the provision of means for adjusting the reel, and consequently the point of reversal, horizonally.

In testimony that I claim the foregoing as my own, I have hereto affixed my signature in the presence of two witnesses.

NATHANIEL D. PARRAN PARSONS.

Witnesses:
F. L. SEARCH,
MASON B. LAWTON.